United States Patent
Klein

(10) Patent No.: US 6,490,361 B1
(45) Date of Patent: Dec. 3, 2002

(54) APPARATUS HAVING A HOUSING WHICH ACCOMMODATES A SOUND TRANSDUCER AND WHICH HAS A PASSAGE

(75) Inventor: Erich Klein, Himberg (AT)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 09/491,627

(22) Filed: Jan. 26, 2000

(30) Foreign Application Priority Data

Jan. 26, 1999 (EP) .............................................. 99890015

(51) Int. Cl.[7] .............................................. H04R 25/00
(52) U.S. Cl. ........................ 381/353; 381/345; 381/370; 381/371
(58) Field of Search .................................. 381/345, 351, 381/370, 371, 353, 354, 346, 347, 348, 162, 396, 382, FOR 150, FOR 149; 181/129

(56) References Cited

U.S. PATENT DOCUMENTS

| 4,005,278 A | * | 1/1977 | Gorike |
| 4,742,887 A | * | 5/1988 | Yamagishi |
| 5,729,605 A | * | 3/1998 | Bobisuthi |
| 5,844,998 A | * | 12/1998 | Nageno |
| 5,867,582 A | * | 2/1999 | Nagayoshi |
| 6,084,976 A | * | 7/2000 | Lin |

* cited by examiner

Primary Examiner—Huyen Le

(57) ABSTRACT

In an apparatus (1) having a housing (2) and having an electroacoustic transducer (14) accommodated in the inner housing space (9) and having at least one passage (28, 29) which traverses a housing wall (6, 7) and which, together with the inner housing space (9) and the rear volume (25) of the transducer (14), which rear volume (25) is open to the inner housing space (9), forms an absorption-circuit resonator which causes a dip (31) in the sound pressure versus frequency response(27), a compensator (32) for the compensation of the dip (31) in the sound pressure versus frequency response (27) is provided and includes the housing (2) being provided with a plurality of ducts (33, 34, 35, 36; 41) traversing the housing (2), each duct forming an acoustic friction.

3 Claims, 1 Drawing Sheet

APPARATUS HAVING A HOUSING WHICH ACCOMMODATES A SOUND TRANSDUCER AND WHICH HAS A PASSAGE

BACKGROUND OF THE INVENTION

1. Field of the Invention

The invention relates to a apparatus having a housing which bounds an inner housing space, and which has a housing wall provided with sound transmission openings and which can be applied to an ear in the area of the sound transmission openings in an on-ear mode of the apparatus, during which, a wall portion of the housing wall, in which the sound transmission openings are situated, can be covered with the ear, and having an electroacoustic transducer accommodated in the inner housing space and arranged adjacent to the sound transmission openings, the transducer having a front volume and a rear volume, and being capable of generating sound which can be emitted into the acoustic free space via the front volume and through the sound transmission openings, the rear volume being open to the inner housing space, and having at least one passage which traverses a housing wall and which, together with the inner housing space and the rear volume of the transducer, the rear volume being open to the inner housing space, forms an absorption-circuit resonator which causes a dip in the sound pressure versus frequency response when the apparatus operates in the on-ear mode, and having compensation means for compensating dip in the sound pressure versus frequency response.

2. Description of the Related Art

Such an apparatus of the type defined in the opening paragraph, is commercially available in various versions and is thus known. Such an apparatus is, for example, commercially available in the form of mobile telephones having the type designations S6 and S10. In the known apparatus, the compensation means for compensating dip in the sound pressure versus frequency response is formed by a digitally-operating electronic compensation circuit which is comparatively intricate and is, therefore, comparatively expensive, this apparatus further having the problem that the frequency range in which the dip in the sound pressure versus frequency response occurs may vary, the compensation provided by the electronic compensation circuit being at least significantly reduced or even lost.

SUMMARY OF THE INVENTION

It is an object of the invention to preclude the afore-mentioned problems and to provide an improved apparatus of the type defined in the opening paragraph, in which the desired result is achieved by simple compensation means.

According to the invention, in order to achieve this object in an apparatus of the type defined in the opening paragraph, the housing has been provided with at least one duct to form the compensation means, this at least one duct traversing the housing and being arranged outside the wall portion that can be covered with an ear, and adjacent to the rear volume of the transducer, and forming an acoustic friction.

By taking the measures in accordance with the invention, it is advantageously achieved, in a very simple manner, that the spurious absorption-circuit resonator is damped in such a manner that the undesired influence of the absorption-circuit resonator on the sound pressure versus frequency response in an on-ear mode of the apparatus is eliminated, or at least reduced to such an insignificant extent that no dip occurs in the sound pressure versus frequency response. A further advantage is that a correct and satisfactory reproduction of low-frequency signals is guaranteed with a comparatively small volume of the inner space of the apparatus, because the acoustic free space outside the apparatus, via the at least one duct, contributes to the reproduction of low-frequency signals, which facilitates the realization of an apparatus in accordance with the invention having minimal external dimensions. In practice, an apparatus in accordance with the invention has a plurality of such ducts, each forming an acoustic friction.

In an apparatus in accordance with the invention, each duct provided as an acoustic friction can be formed by a bore which traverses a housing wall and which, in the case of a plastic housing, can be formed during injection-molding of the housing. However, it has proven to be particularly advantageous if the housing comprises at least two housing sections which can be joined together, which adjoin each other in the area of a separating zone and have two wall portions in the area of the separating zone which adjoin one another in an acoustically impervious manner, and to form the at least one duct in the area of at least one wall portion, at least one trough-shaped recess which is open to this wall portion has been provided, this at least one recess being closed at its open side by the other wall portion. In this way, each duct forming an acoustic friction can be manufactured in a very simple manner and with a high precision, particularly if the housing is made of a plastic, in which case each recess can be formed during injection-molding of the relevant housing section.

In an apparatus in accordance with the invention it has further proven to be advantageous if the the housing has the shape of a rectangular parallelepiped and has a front main wall, a rear main wall, and four side walls, and the sound transmission openings have been provided in the front main wall, and the at least one duct has been provided in the area of a side wall adjacent to the transducer. Such a construction has proved to be very advantageous in practice.

The afore-mentioned as well as further aspects of the invention will become apparent from the embodiments described hereinafter and given by way of example and will be elucidated with reference to these embodiments.

BRIEF DESCRIPTION OF THE DRAWINGS

The invention will be described in more detail with reference to the drawing, which shows two embodiments, given by way of example, to which the invention is not limited, in which.

DESCRIPTION OF THE PREFERRED EMBODIMENTS

Figure 1:
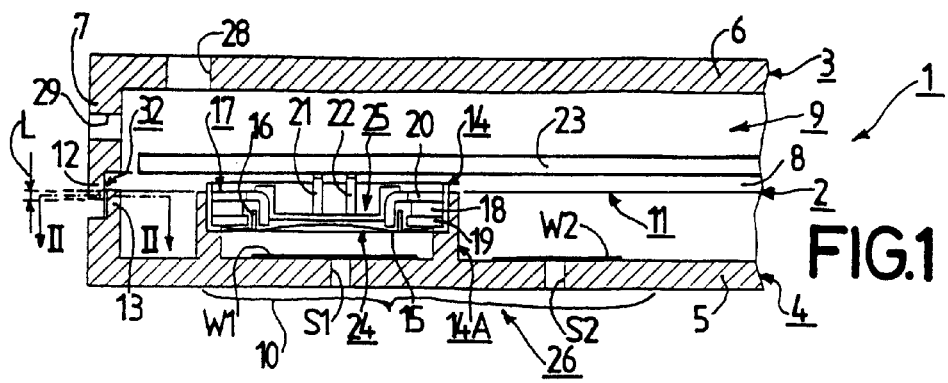
FIG. 1 shows an enlarged-scale sectional view of a part of an apparatus in accordance with a first embodiment of the invention.

FIG. 1 shows an apparatus 1 in accordance with the invention, which is a so-called mobile telephone.

The apparatus 1 has a housing 2 which comprises two housing sections 3 and 4 in the form of two half-shells. The housing 2 has the shape of a rectangular parallelepiped and has a front main wall 5, a rear main wall 6, and four side walls, of which only a short side wall 7 and a long side wall 8 are visible in FIG. 1. The housing 2 bounds an inner housing space 9.

The front main wall 5 has sound transmission openings S1, of which FIG. 1 diagrammatically shows only one sound transmission opening S1. In an on-ear mode of the apparatus 1, the front main wall 5 can be applied to an ear at the location of the sound transmission openings S1, in this mode, a wall portion, provided with the sound transmission openings S1 and indicated, diagrammatically, by means of a bracket 10, can cover the ear.

As already stated hereinbefore, the housing comprises two housing sections 3 and 4 in the form of half shells which can be joined. The two housing sections 3 and 4 adjoin one another with two wall portions 12 and 13 (see also FIG. 2) in an acoustically impervious manner in the area of the separating zone 11. The two housing sections 3 and 4 are stepped in the area of the separating zone 11.

The apparatus 1 includes an electroacoustic transducer 14 accommodated in the inner housing space 9 and arranged adjacent the sound transmission openings S1, this transducer being mounted in a substantially hollow cylindrical transducer holder 14A. In the present case, the electroacoustic transducer 14 is an electrodynamic transducer having a diaphragm 15 capable of vibrating and connected to a voice coil 16 arranged inside an annular air gap of a magnet system 17. The magnet system 17 comprises a magnet 18 and a ring-shaped first yoke 19 as well as a second yoke 20 having a ring-shaped portion and a hollow cylindrical portion. Said annular portion is formed between the free end face of the hollow cylindrical portion of the second yoke 20 and the inner part of the ring-shaped first yoke 19. The voice coil 16 has two contacts 21 and 22 electrically connected to corresponding contacts, not shown, on a diagrammatically shown printed circuit board 23, which, inter alia, accommodates the power supply for the transducer 14. The electroacoustic transducer 14 has a front volume 24 situated at the front of the diaphragm 15 and a rear volume 25 situated at the rear of the diaphragm 15. The rear volume 25 of the transducer 14 is in open communication with the inner housing space 9. This means that the entire volume of the inner housing space 9 communicates with the rear volume 25 of the transducer 14, as a result of which, the entire volume of the inner housing space 9 has a substantial influence on the acoustic behavior of the transducer 14 and of the entire apparatus 1.

Figure 3:
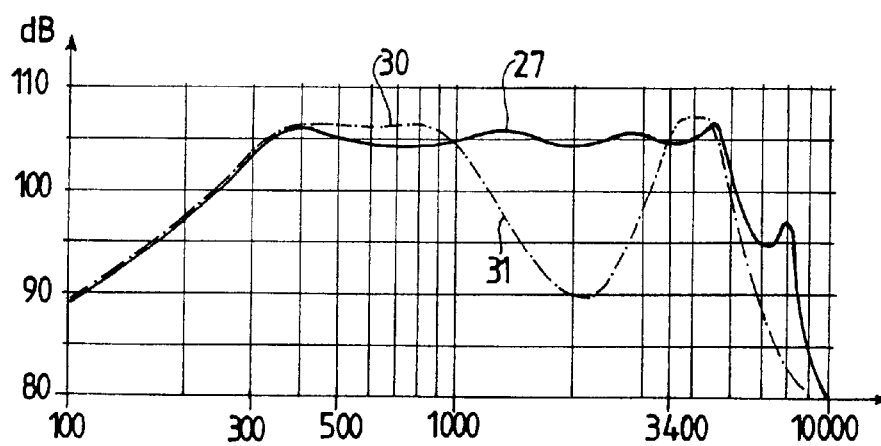
FIG. 3 is a diagram representing the variation of the sound pressure versus frequency response in the apparatus of FIG. 1.

The transducer 14 can produce sound which can propagate into the acoustic free space 26 via the front volume 24 and through the sound transmission openings S1. In the present case, the useful frequency range of the radiated sound waves lies between approximately 300 Hz and 3400 Hz, these two values being shown separately in FIG. 3. In FIG. 3, the variation of the sound pressure versus frequency response in an on-ear mode of the apparatus 1 while the front main wall 5 is applied to an ear of a user, is shown as a solid line referenced 27.

The front main wall 5 of the apparatus 1 has additional sound transmission openings S2, all the sound transmission openings S2, shown as only one sound transmission opening S2 in FIG. 1. Via the sound transmission openings S2, sound emitted by the transducer 14 via the rear volume 25 of the transducer 14 can also be transmitted into the acoustic free space 26 in the area of the front main wall 5, which, in an on-ear mode, has the advantage that low frequency sound components transmitted to an ear are attenuated.

As regards the sound transmission openings S1 and the additional sound transmission openings S2, it is to be noted that all these sound transmission openings S1 and S2 are covered with a piece of fabric W1 and W2, respectively, the two pieces of fabric W1 and W2 providing acoustic frictions by means of which undesired resonances can be damped so as to achieve a proper comparatively smooth sound pressure versus frequency response.

As is shown in FIG. 1, the housing 2 of the apparatus 1 has two passages 28 and 29 which each traverse a respective one of the housing walls 6 and 7. The passage 28 has been provided, for example, for receiving or mounting a so-called belt clip. In the present case, the passage 29 has been provided for the introduction of a so-called SIM card. It is to be noted that such a passage may also be provided for mounting an antenna. However, such a passage may also be provided or may be necessary for reasons of molding technology, so as to enable housing sections to be manufactured at low cost.

With the inner housing space 9 and with the rear volume 25, which is in open communication with the inner housing space 9, each of the two passages 28 and 29 forms an absorption-circuit resonator which gives rise to a dip in the sound pressure versus frequency response each time that the apparatus 1 is operated in the on-ear mode. In this respect, reference is made to the sound pressure versus frequency response curve shown as a dash-dot line in FIG. 3 and bearing the reference 30. This sound pressure versus frequency response curve 30 exhibits such a dip 31. If the apparatus 1 had not been provided with additional compensation means 32 for the compensation of the dip 31 in the sound pressure versus frequency response, this dip 31 in the sound pressure versus frequency response curve 30 would actually occur during on-ear operation in the area of the ear, which would obviously result in a deterioration in the sound reproduction quality and, particularly, non-compliance with standardized and mandatory approval criteria.

Figure 2:
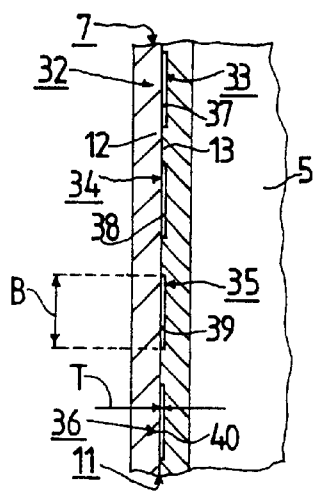
FIG. 2 shows a detail of the apparatus of FIG. 1 in a sectional view taken on the line II—II in FIG. 1.

In a particularly simple and advantageous manner, a plurality of ducts have been provided as compensation means 32, of which four ducts 33, 34, 35 and 36 are shown in FIG. 2. These ducts 33, 34, 35 and 36 have been provided in the housing 2. Each of the ducts 33, 34, 35 and 36 traverses the housing 2 and is situated outside the wall portion 10 that can be covered by an ear and adjacent the rear volume 25 of the transducer 14. The construction of each duct 33, 34, 35 and 36, i.e., its dimensioning, is then such that each of the ducts 33, 34, 35 and 36 forms an acoustic friction.

In order to form the ducts, i.e., also the four ducts 33, 34, 35 and 36, four trough-like recesses 37, 38, 39 and 40 are formed in the area of a wall portion 13, these recesses opening towards this wall portion 13 and being closed by the other wall portion 12 at their open sides. The trough-like recesses 37, 38, 39 and 40 may each have a width B of, for example, 10 mm, and a depth T of, for example, 0.3 mm. Alternatively, the width B may lie in a range between 6 and 18 mm. The sum of the widths B of all the ducts may have a value in a range between 40 mm and 140 mm. The depth T may alternatively lie in a range between 0.1 and 0.4 mm. In the present case, as can be seen in FIG. 1, the length L of the ducts 33, 34, 35 and 36 is approximately 0.3 mm and may alternatively lie in a range between 0.2 mm and 0.5 mm.

As can be seen in FIG. 1, the ducts 33, 34, 35 and 36 have been provided in the area of a side wall adjacent the transducer 14, namely, in the area of the short side wall 7, because this has proved to be very advantageous in practice.

However, they may alternatively be situated in the area of a long side wall.

By the provision of the four ducts 33, 34, 35 and 36 as compensation means 32, the undesired effect of the absorption-circuit resonator is damped in a particularly simple manner, as a result of which, the sound pressure versus frequency response which is actually obtained with the apparatus 1, and whose curve 27 is shown in FIG. 3, does not exhibit a dip at higher frequencies, a relatively smooth sound pressure versus frequency response being obtained in the useful frequency range between 300 Hz and 3400 Hz, as can be seen in FIG. 3.

Figure 4:
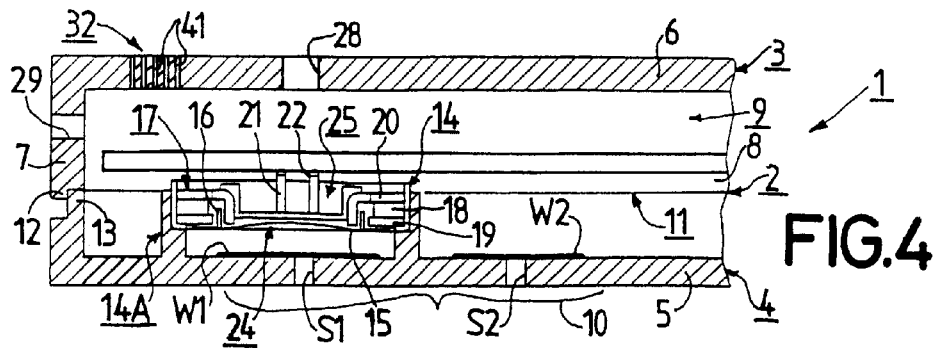
FIG. 4 shows, in a manner similar to FIG. 1, an apparatus in accordance with a second embodiment of the invention.

The apparatus 1 shown in FIG. 4 also includes compensation means 32 for the compensation of a dip in the sound pressure versus frequency response. In the apparatus 1 shown in FIG. 4, the housing 32 has ducts formed by bores 41, which each form an acoustic friction, and of which FIG. 4 shows five such bores 41, which represent all the bores 41. The bores 41 may have, for example, a diameter of 0.3 mm and a few hundreds of such bores 41 may be provided. In the present case, the bores 41 traverse the rear main wall 6 of the housing 2. However, such bores 41 may also be provided in the short side wall 7 or in the long side wall 8 or in the long side wall facing the long side wall 8, or in the front main wall 5 of the housing 2, or also in, for example, two housing walls at the same time.

The invention is not limited is not limited to the two embodiments described hereinbefore. For example, the trough-like recesses provided in the area of a separating zone may alternatively be of semi-oval cross-section or of V-shaped cross-section. The invention can be used not only in mobile telephones but also in other apparatuses, for example in a "personal communicator".

What is claimed is:

1. An apparatus having a housing bounding an inner housing space and having a housing wall provided with sound transmission openings, said apparatus being applicable to an ear of a user in an area of the sound transmission openings in an on-ear mode of the apparatus, said apparatus further having an elecroacoustic transducer accommodated in the inner housing space and arranged adjacent to the sound transmission openings, said electroacoustic transducer having a front volume and a rear volume and being capable of generating sound for emission into the acoustic free space via the front volume and through the sound transmission openings, the rear volume being open to the inner housing space, and said apparatus further having at least one passage traversing a housing wall and forming, together with the inner housing space and the rear volume of the electroacoustic transducer, an absorption-circuit resonator which causes a dip in the sound pressure versus frequency response when the apparatus operates in the on-ear mode, and said apparatus further having compensation means for compensation of the dip in the sound pressure versus frequency response, characterized in that said compensation means comprises at least one duct traversing the housing and being arranged outside the wall portion covered by an ear in the on-ear mode and adjacent to the rear volume of the electroacoustic transducer, said at least one duct forming an acoustic friction.

2. The apparatus as claimed in claim 1, characterized in that the housing comprises at least two housing sections capable of being joined together, said two housing section adjoining each other in an area of a separating zone and having two wall portions in the area of the separating zone which adjoin one another in an acoustically impervious manner, and, to form the at least one duct in the area of at least one wall portion, at least one trough-shaped recess which is open to this wall portion, said at least one trough-shaped recess being closed at its open side by the other wall portion.

3. The apparatus as claimed in claim 1, characterized in that the housing has a rectangular parallelepiped shape and has a front main wall, a rear main wall, and side walls, the sound transmission openings being provided in the front main wall, and the at least one duct being provided in the area of a side wall adjacent to the electroacoustic transducer.

* * * * *